United States Patent [19]

Nishikaji et al.

[11] Patent Number: 5,096,971
[45] Date of Patent: Mar. 17, 1992

[54] ADSORBENT FOR OPTICAL RESOLUTION AND RESOLUTION METHOD EMPLOYING IT

[75] Inventors: Takashi Nishikaji, Sagamihara; Hideaki Kiniwa; Tsunehiko Kurata, both of Yokohama, all of Japan

[73] Assignee: Mitsubishi Kasei Corporation, Tokyo, Japan

[21] Appl. No.: 424,693

[22] Filed: Oct. 20, 1989

[30] Foreign Application Priority Data

Oct. 24, 1988 [JP] Japan .................. 63-267599

[51] Int. Cl.$^5$ .................. C08F 261/06; C08F 265/04; C08F 291/10
[52] U.S. Cl. .................. 525/278; 525/298; 525/309
[58] Field of Search .................. 525/278, 298, 309

[56] References Cited

U.S. PATENT DOCUMENTS 4,554,323 11/1985 Yuki et al. .................. 525/272
4,694,044 9/1987 Kiniwa .................. 525/178

FOREIGN PATENT DOCUMENTS 2758036 8/1979 Fed. Rep. of Germany .

OTHER PUBLICATIONS

Patent Abstracts of Japan, vol. 11, No. 222 (C-435) [2669], 18th Jul. 1987 & JP-A-62 38 238 (Res. Dev. Corp. of Japan) 19-02-1987.

*Primary Examiner*—John C. Bleutge
*Assistant Examiner*—Vasu S. Jagannathan
*Attorney, Agent, or Firm*—Oblong, Spivak, McClelland, Maier & Neustadt

[57] ABSTRACT

An adsorbent for optical resolution obtained by graft polymerizing an optically active vinyl monomer of the formula:

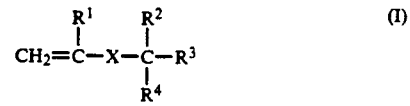

wherein X is —CONH—, —COO— or —NHCOO—, $R^1$ is a hydrogen atom or a methyl group, and each of $R^2$ to $R^4$ which are different from one another, is a hydrogen atom, a hydrocarbon group or an alkoxycarbonyl group, or $R^2$ and $R^3$ together form a ring, to a crosslinked polymer carrier having groups to which said monomer is graft polymerizable.

5 Claims, 1 Drawing Sheet

ADSORBENT FOR OPTICAL RESOLUTION AND RESOLUTION METHOD EMPLOYING IT

The present invention relates to a novel adsorbent for optical resolution having a high level of optical resolution ability and being free from densification even under the pressure of a liquid passed therethrough at a high flow velocity, and a resolution method employing it.

Optical resolution i.e. a method for resolving a racemic mixture which is a mixture of optical antipodes, to the respective optical antipodes, is used in the medical, agricultural and food industries. A common industrial resolution method comprises converting a racemic mixture to a mixture of diastereomers and resolving the mixture of diastereomers based on the difference in their physical properties. In addition to this method, a method of resolving a racemic mixture by means of chromatography has been actively studied in recent years. As a resolution method by means of chromatography, it has been proposed to use an optically active adsorbent such as a porous silica gel coated with a cellulose derivative such as cellulose triacetate or with optically active poly(triphenylmethyl) methacrylate, as a stationary phase, or to use a copolymer of an optically active vinyl monomer with a small amount of crosslinkable monomer, as an adsorbent (e.g. Japanese Examined Patent Publication No. 7503/1984 and Japanese Unexamined Patent Publication No. 67056/1987).

The types of racemic mixtures which can be resolved by the method of converting a racemic mixture to a mixture of diastereomers, followed by resolution based on the difference of their physical properties, are rather limited.

In the resolution method by means of chromatography, the optically active adsorbent used as the stationary phase is limited in its application to analytical means, and for its industrial application, it has problems with respect to the durability and efficiency in its production.

The adsorbent obtained by copolymerizing an optically active vinyl monomer with a small amount of a crosslinkable monomer, has a drawback that the crosslinking degree is so low that it tends to be densified, and it tends to be difficult to pass a liquid therethrough under a high pressure at a high flow velocity.

It is an object of the present invention to provide an adsorbent having an excellent optical resolution ability without densification under passage of a liquid at a high flow velocity.

Another object of the present invention is to provide a resolution method wherein the adsorbent having such an excellent optical resolution ability is used.

The present invention provides an adsorbent for optical resolution obtained by graft polymerizing an optically active vinyl monomer of the formula:

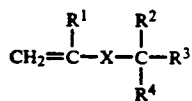

(I)

wherein X is —CONH—, —COO— or —NHCOO—, $R^1$ is a hydrogen atom or a methyl group, and each of $R^2$ to $R^4$ which are different from one another, is a hydrogen atom, a hydrocarbon group or an alkoxycarbonyl group, or $R^2$ and $R^3$ together form a ring, to a crosslinked polymer carrier having groups to which said monomer is graft polymerizable.

The present invention also provides a method for resolving a racemic mixture to its optical antipodes, which comprises contacting the racemic mixture to the above adsorbent for optical resolution.

Now, the present invention will be described in detail with reference to the preferred embodiments.

In the present invention, the optically active vinyl monomer graft-polymerized to the crosslinked polymer carrier is represented by the above-mentioned formula I. In the formula, the hydrocarbon group for each of $R^2$ to $R^4$ may be an alkyl group having from 1 to 12 carbon atoms such as a methyl group, an ethyl group, a propyl group, a butyl group, a hexyl group or an octyl group, preferably a lower alkyl group having from 1 to 4 carbon atoms, an aryl group such as a phenyl group or a naphthyl group, an aralkyl group such as a benzyl group, or a cycloalkyl group such as a cyclohexyl group or a menthyl group. The alkoxycarbonyl group may be a lower alkoxycarbonyl group such as a methoxycarbonyl group, an ethoxycarbonyl group or a butoxycarbonyl group. As the optically active vinyl monomer having such substituents, an acid amide of an optically active primary amine or an alkyl ester of an optically active amino acid with acrylic acid or with methacrylic acid; an ester of an optically active secondary alcohol with acrylic acid or with methacrylic acid; or an ester of an optically active secondary alcohol with vinyl carbamic acid or with isopropenyl carbamic acid, may be employed. Specifically, it may be an acid amide obtained from (R)-1-phenylethylamine, (R)-1-naphthylethylamine, (R)-1-cyclohexylethylamine, as the primary amine, or (R)-phenylalanine ethyl ester, as the alkylester of an amino acid, or an antipode thereof, and acrylic acid or methacrylic acid, or an ester of (R) 1-phenylethyl alcohol, (R)-1-naphthylethyl alcohol, (R)-1-cyclohexylethyl alcohol, or an antipode thereof, or one of eight possible optical isomers of 5-methyl-2-(1-methylethyl)-cyclohexanol, as the secondary alcohol and acrylic acid, methacrylic acid, vinylcarbamic acid or isopropenylcarbamic acid.

As specific compounds, the following may be mentioned:

(R) or (S)-N-(1-phenylethyl) methacrylamide, (R) or (S)-N-(1-cyclohexylethyl) methacrylamide, (R) or (S)-N-(1-naphthylethyl) methacrylamide, N methacryloyl-L-phenylalanine ethyl ester, (R) or (S)-N-(1-phenylethyl) acrylamide, (R) or (S)-N-(1-cyclohexylethyl) acrylamide, (R) or (S)-N-(1-naphthylethyl) acrylamide, N-acryloyl-L-phenylalanine ethyl ester, (R) or (S)-1-phenylethyl methacrylic acid ester, (1R,2S,5R)-menthyl methacrylic acid ester, (R) or (S)-1-phenylethyl acrylic acid ester, (1R,2S,5R)-menthylacrylic acid ester, (R) or (S)-1-phenylethyl-N-vinylcarbamic acid ester, (1R,2S,5R)-menthyl-N-vinylcarbamic acid ester, (R) or (S)-1-phenylethyl-N-isopropenylcarbamic acid ester, and (1R,2S,5R)-menthyl-N-isopropenylcarbamic acid ester.

The crosslinked polymer carrier to which the optically active vinyl monomer is graft polymerized, is suitably selected depending upon the type of the vinyl monomer and the type of the graft polymerization method employed among those having functional groups constituting initiation sites for graft polymerization.

For the graft polymerization, various methods may be employed. For example, there may be mentioned a method wherein a cerium salt is used as an initiator, a method wherein radical polymerization is applied to a polymer having double bonds, a method wherein chain transfer is applied to a polymer having mercapto groups or halogen groups, a method wherein chain transfer is conducted by using a peroxide initiator such as benzoyl peroxide and an azo type initiator such as azobisisobutyronitrile, a method wherein a redox initiator such as a combination of a persulfate and a reducing agent, is employed, a method wherein a polymer having perester groups, diazo groups and azonitrile groups, is used as an initiator, and a method wherein radical polymerization initiating sites are generated by irradiation of radiation.

When the crosslinked polymer carrier is a copolymer having diol groups such as a copolymer of glycerol monomethacrylate with ethylene glycol dimethacrylate or a polymer obtained by converting epoxy groups of an epoxy group-containing polymer to diol groups by e.g. an acid, such as a copolymer of glycidyl monomethacrylate with ethylene glycol dimethacrylate, or a copolymer of vinylbenzylglycidyl ether with divinyl benzene, a method wherein a cerium salt is used as an initiator, is employed. In the case of a polymer having radical polymerizable double bonds, such as copolymer of methyl methacrylate with ethylene glycol dimethacrylate having a crosslinking degree of 99%, a radical polymerization method to the remaining unpolymerized double bonds, is employed. Further, in the case of a polymer having mercapto groups or halogen groups, a chain transfer method is employed, wherein as the polymer, a polymer obtained by converting epoxy groups of a polymer such as a copolymer of glycidyl monomethacrylate with ethylene glycol dimethacrylate to thioglycolic acid esters by a thioglycolic acid to introduce mercapto groups, is employed.

The crosslinking degree of the crosslinked polymer carrier is usually at least 15%, preferably from 15 to 99.5%, most preferably from 20 to 99%. In the case of a polymer carrier having radical polymerizable double bonds, a crosslinking degree within a range of from 99 to 100% is also suitable. Here, the crosslinking degree is represented by the weight ratio of the crosslinkable monomer to the total amount of polymerizable monomers. The crosslinkable monomer to be used is a compound containing at least two polymerizable vinyl groups. If the crosslinking degree is too low, the densification is likely to result when packed into a column, whereby it becomes difficult to pass a liquid therethrough at a high flow velocity.

The physical structure of the crosslinked polymer carrier used here may be of a gel type or of a porous type. Preferred is a porous type. Particularly preferred is a porous type carrier having a surface area of from 1 to 2,000 m$^2$/g. A usual method for producing such a porous carrier, may be, for example, a method wherein a suitable diluent is added to the monomer phase so that a porous polymer is obtained by the phase separation between the diluent and the polymer formed during the progress of polymerization, or a method wherein polymerization is conducted in the presence of a linear polymer such as polystyrene, polymethylstyrene or polymethyl acrylate in the monomer phase, and then the linear polymer is extracted and removed from the formed spherical gel to obtain a porous carrier.

The crosslinked polymer carrier used in the present invention is usually spherical. However, it is possible to use a product finely pulverized and classified, as the case requires. Further, when a crosslinked polymer having a narrow particle size distribution is employed as the crosslinked polymer carrier, it is possible to obtain a graft polymer having a narrow particle size distribution, which is advantageous particularly when it is used for column chromatography, since it is thereby possible to obtain a high plate numbers.

The size of the crosslinked polymer particles varies depending upon the particular purpose, but is usually selected within a range of from 1 to 1,000 μm. When the vinyl monomer is graft polymerized to the crosslinked polymer in the present invention, the reaction conditions and the type of the initiator vary depending upon the graft method employed, but they may be suitably determined from the known methods. (See e.g. Kogyo Kagaku Zasshi Vol. 64, No. 9, p. 162 (1961), Japanese Examined Patent Publication No. 54126/1987, and Journal of Polymer Science Vol. XXXVII, p. 411 (1959).)

The polymer obtained by graft polymerizing the optically active monomer to the crosslinked polymer carrier, is separated from the reaction mixture and purified by thoroughly washing off the reaction reagents, etc.

The graft degree of the optically active monomer to the crosslinked polymer carrier is preferably from 5 to 60% by weight, more preferably from 10 to 50% by weight, most preferably from 10 to 40% by weight, in the resulting polymer. Here, the graft degree is the weight ratio of the units derived from the optically active monomer in the resulting adsorbent for optical resolution.

The polymer produced by the above method is used as the adsorbent. As a method for evaluating the adsorptivity prior to use, a batch method or a column chromatography method is usually employed. When highly difficult separation such as resolution of optical antipodes is to be conducted, it is preferred to conduct the evaluation by a column chromatography method.

The column chromatography method is usually conducted in the following manner. Firstly, the adsorbent is suspended in a solvent which is used for elution, and the suspension is transferred to a column. The object to be separated is dissolved in a small amount of the solvent, and the resulting solution is injected to the top of the column. Then, an eluting solution is passed through this column, and the eluate from the column is fractionally recovered by a usual method. Then, the angle of rotation of each fraction is measured to ascertain the degree of resolution of the racemic modification.

The adsorbent for optical resolution according to the present invention is capable of efficiently resolving many differend kinds of racemic mixtures. It is particularly useful under a high flow velocity condition. Specifically, it is very useful as an adsorbent for optical resolution of a racemic mixture of e.g. a hydroxycarboxylic acid, an amino acid and a derivative of such compound, an N-benzoyl derivative such as phenylalanine, hydantoin derivative, binaphtol or propanediol.

When the racemic mixture is to be resolved to optically active antipodes by means of the adsorbent of the present invention, it is usually advantageous to employ a column chromatography method.

For the separation method by column chromatography, a conventional method commonly used can be employed, which may be the same as the method described above as the evaluation method. The solvent to be used for elution and packing the column varies depending upon the type of the compound to be separated and the type of the adsorbent. However, it is usually selected from organic solvents capable of adequately dissolving the compound to be separated and capable of swelling the adsorbent. Specific examples of such a solvent include aromatic hydrocarbons such as toluene and xylene, ethers such as diethyl ether, dioxane and tetrahydrofuran and halogenated hydrocarbons such as dichloroethane, trichloromethane and carbon tetrachloride. These solvents may be used alone or in combination as a mixture. Further, a solvent which does not swell the adsorbent, such as a hydrocarbon such as pentane or hexane, an alcohol such as ethanol or 2-propanol, or water, may also be used in combination with the organic solvent capable of swelling the adsorbent.

By the graft polymerization of the optically active monomer to the crosslinked polymer carrier, it has been made possible to produce an adsorbent free from a problem of densification under a high flow velocity condition or under a high packing layer condition without impairing the optical resolution ability of the graft polymer portion composed of the optically active monomer. Further, since the graft polymer portion does not contain any optically inactive comonomer which may impair the optical resolution ability and since there is no crosslinking which impairs freeness of the polymer chain, the obtained graft polymer shows a high level of separating ability when used for chromatography. Furthermore, since it is a polymer grafted to the carrier surface, a sharp separation pattern with excellent diffusion is obtainable. As described in the foregoing, the adsorbent for optical resolution of the present invention has excellent properties for practical application.

BRIEF DESCRIPTION OF THE DRAWINGS

In the accompanying drawings.

Figure 1:
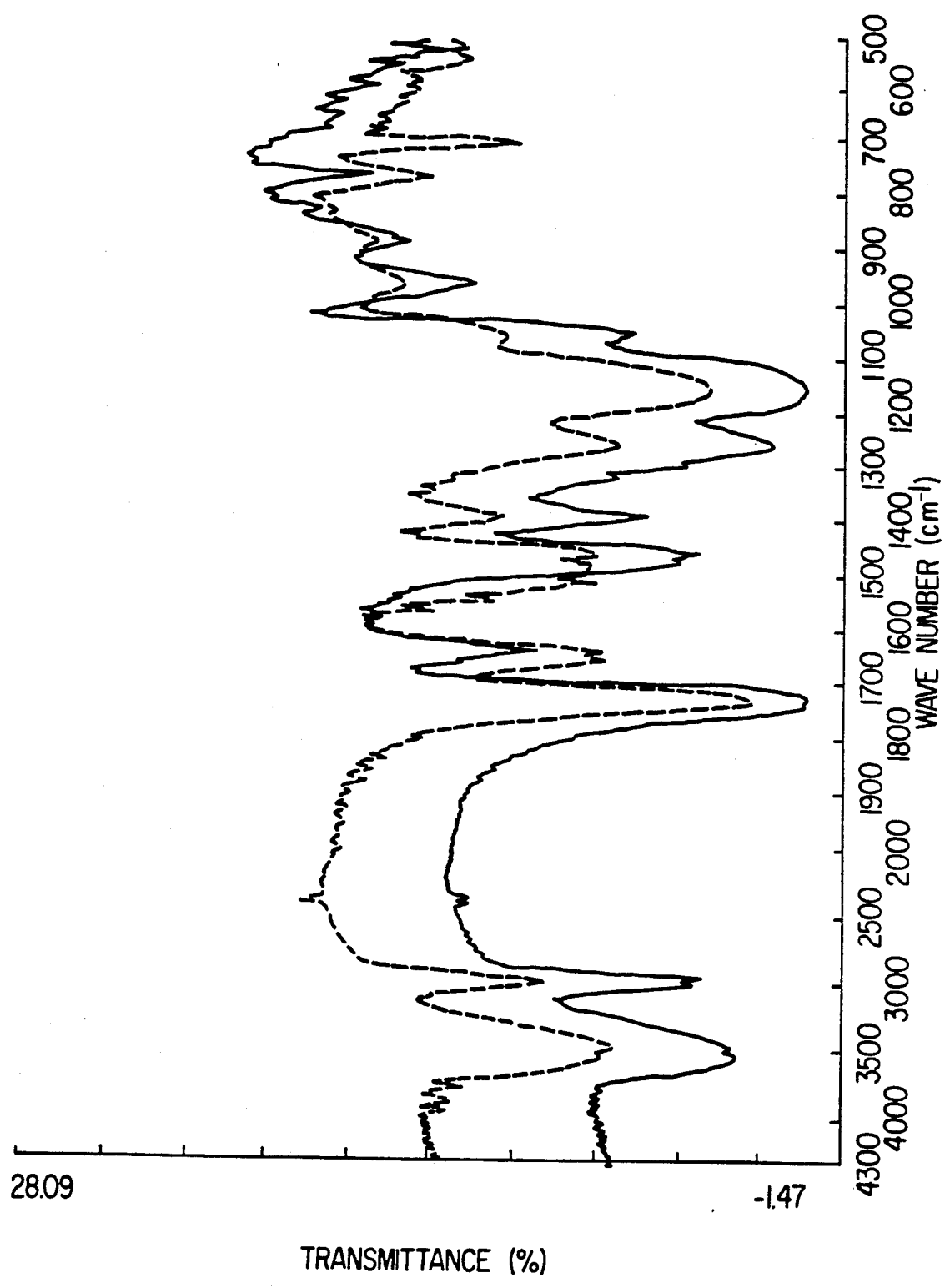
FIG. 1 is a graph showing the infrared absorption spectra of the adsorbent prepared in Example 1 (broken line) and the glycerol monomethacrylate/ethylene glycol dimethacrylate copolymer used as the porous carrier (solid line).

Now, the present invention will be described in further detail with reference to Examples and Application Examples. However, it should be understood that the present invention is by no means restricted to such specific Examples and Application Examples.

EXAMPLE 1

6.0 g of (S)-N-(1-phenylethyl)-methacrylamide was dissolved in 12 g of 1,2-dichloroethane. Then, to this solution, 4.0 g of porous polymer particles (dry) of a glycerol monomethacrylate/ethylene glycol dimethyacrylate copolymer having a particle size of from 10 to 20 μm, a crosslinking degree of 80% and a surface area of 109 m²/g as measured by a nitrogen absorption method, was added and left to stand at room temperature for one hour to have the optically active vinyl monomer impregnated. Then, the polymer was collected by filtration and dispersed in 115 g of water. To this polymer particle dispersion, 5.0 ml of a 0.5N HNO$_3$ aqueous solution was added, and the mixture was heated to 50° C under nitrogen. Then, 5.0 ml of a 0.05N (NH$_4$)$_2$Ce(NO$_2$)$_6$ aqueous solution was added thereto, and the mixture was stirred for 6 hours at a rotational speed of 150 rpm for polymerization. Then, 50 ml of a methanol solution containing 1000 ppm of 4-t-butyl-benzoyl catechol (TBC) was added to terminate the polymerization. The formed polymer was collected by filtration and purified by washing sequentially with hot water, methanol, acetone and toluene. In FIG. 1, the infrared absorption spectrum (broken line) of the formed polymer and the infrared absorption spectrum (solid line) of the glycerol monomethacrylate/ethylene glycol dimethacrylate copolymer used as the porous carrier are shown. In the infrared absorption spectrum of the formed polymer, an absorption attributable to the amide of the graft polymer is observed in the vicinity of 1650 cm$^{-1}$, and an absorption attributable to the benzene ring of the graft polymer is observed in the vicinity of 700 cm$^{-1}$. The elemental analysis of this polymer gave the following values.

C=61.55%
H=7.15%
N=2.26%

The graft degree was 31.2% by weight as calculated from the nitrogen content. From the above results, it is evident that the optically active methacrylamide monomer was graft polymerized.

EXAMPLE 2

An adsorbent was prepared in the same manner as in Example 1 by using the same (S)-N-(1-phenylethyl)methacrylamide as used in Example 1 as the optically active vinyl monomer and porous polymer particles obtained by converting epoxy groups of the vinylbenzene glycidyl ether/ethylvinylbenzene/divinylbenzene copolymer having a particle size of from 5 to 15 μm and a crosslinking degree of 64%, to diol groups by a dioxane aqueous solution containing 10% by weight of sulfuric acid, as the crosslinked polymer carrier. The infrared absorption spectrum of this adsorbent was measured, whereby the absorption attributable to the graft polymer was observed in the vicinity of 1650 cm$^{-1}$ and in the vicinity of 700 cm$^{-1}$ as in Example 1. The elemental analysis gave the following values.

C=84.40%
H=7.81%
N=0.94%

The graft degree was 9.9% by weight as calculated from the nitrogen content.

EXAMPLE 3

An adsorbent was prepared in the same manner as in Example 1 except that (S)-N-(1-naphthylethyl)-methacrylamide was used as the optically active vinyl monomer. The infrared absorption spectrum of this adsorbent was measured, whereby the absorption attributable to the graft polymer was observed in the vicinity of 1650 cm$^{-1}$ and in the vicinity of 800 cm$^{-1}$ as in Example 1. The elemental analysis gave the following values.

C=61.52%
H=6.70%
N=1.82%

The graft degree was 31.1% by weight as calculated from the nitrogen content.

EXAMPLE 4

An adsorbent was prepared in the same manner as in Example 1 except that (S)-N-(1-cyclohexylethyl)-methacrylamide was used as the optically active vinyl monomer. The infrared absorption spectrum of this adsorbent was measured, whereby the absorption attributable to the graft polymer was observed in the vicinity of 1650 cm$^{-1}$ as in Example 1. The elemental analysis gave the following values.

C=62.73%
H=8.27%

N=2.27%

The graft degree was 31.7% by weight as calculated from the nitrogen content.

EXAMPLE 5

4.0 g of N-acryloyl-L-phenylalanine ethyl ester was dissolved in 9 g of 1,2-dichloroethane. Then, to this solution, 4.0 g of dried porous polymer particles of an ethylene glycol dimethyacrylate/methyl methacrylate copolymer having a particle size of from 5 to 10 μm, a crosslinking degree of 99% and a surface area of 420 m$^2$/g, was added and left to stand at room temperature for one hour to have the optically active vinyl monomer impregnated. Then, the polymer was collected by filtration and dispersed in 792 g of water having 8.0 g of polyvinyl alcohol dissolved therein. This dispersion was stirred under nitrogen at 80° C. for 8 hours at rotational speed of 120 rpm for polymerization. The formed polymer was collected by filtration and purified by washing sequentialy with water, methanol, acetone and toluene. The infrared absorption spectrum of this polymer was measured, whereby the absorption attributable to the graft polymer was observed in the vicinity of 1650 cm$^{-1}$ and in the vicinity of 700 cm$^{-1}$ as in Example 1. The elemental analysis gave the following values.

C=61.11%
H=6.90%
N=2.40%

The graft degree was 32.0% by weight as calculated from the nitrogen content.

EXAMPLE 6

An adsorbent was prepared in the same manner as in Example 1 by using (1R,2S,5R)-menthyl methacrylic acid ester as the optically active vinyl monomer and porous polymer particles prepared by converting epoxy groups of a vinylbenzyl glycidyl ether/ethylvinylbenzene/divinylbenzene copolymer having a particle size of from 5 to 15 μm and a crosslinking degree of 48%, to diol groups by a dioxane aqueous solution containing 10% by weight of sulfuric acid, as the crosslinked polymer carrier. The infrared absorption spectrum of this adsorbent was measured, whereby the absorption attributable to the graft polymer was observed in the vicinity of 1700 cm$^{-1}$. Further, when subjected to C$_{13}$ solid NMR analysis, an absorption attributable to the carbonyl carbon of the ester bond of the graft polymer was observed. The graft degree was 27% by weight as calculated from the proportion of the carbonyl carbon.

EXAMPLE 7

The adsorbent was prepared in the same manner as in Example 5 except that (1R,2S,5R)-menthyl-N-vinylcarbamic acid ester was used as the optically active vinyl monomer. The infrared absorption spectrum of this adsorbent was measured, whereby an absorption attributable to the urethane bond of the graft polymer was observed in the vicinity of 1500 cm$^{-1}$. The elemental analysis of this adsorbent gave the following values.

C=60.06%
H=8.00%
N=1.65%

The graft degree was 26.5% by weight as calculated from the nitrogen content.

APPLICATION EXAMPLE 1

The adsorbent prepared in Example 1 was packed in a stainless steel column under the following condition.

As the packing pump, a high performance liquid chromatography apparatus manufactured by Shimadzu Corporation was used, and as the packing device, a large size packer manufactured by Gasukuro Kogyo K.K. was used. Further, the liquid was supplied by a constant flow method.

Column: Inner diameter 7.6 mm × height 250 mm
Packing solution: Toluene
Flow velocity: 5 ml/min.
Temperature: Room temperature The adsorbent was packed without any trouble under the above packing condition, whereby there was no problem of densification at all. Then, resolution of racemic 1,1'-binaphthol was conducted by a chromatography method by using this packed column. For supplying the eluting solution and the detection, a semifractional liquid chromatography apparatus manufactured by Waters Co. was used. The conditions for chromatography were as follows.

Eluting solution: A mixture of toluene/dioxane=75/25
Flow velocity: 0.5 ml/min.
Temperature: 20° C.
Detection: Differential refractive index detector and angle of rotation detector
Amount of sample: 200 μl of 0.5% solution The results of resolution by the chromatography of racemic 1,1'-binaphthol are shown in Table 1.

The optical yield in the Table was obtained by the following method. Namely, at the time of resolution of the racemate by chromatography, the sample concentration and the degree of rotation were simultaneously measured by means of a differential refractive index detector for measuring the sample concentration in the eluate and a degree of rotation detector for measuring the degree of rotation of the eluate. By comparing the areas of the chromatograms drawn by the two detectors, the optical yield was calculated from the following equation.

$$\text{Optical yield} = \frac{A(1)}{A(2)} \times C$$

where
A(1): Area of chromatogram by the degree of rotation detector
A(2) Area of chromatogram by the differential refractive index detector $$C = \frac{a(2)}{a(1)}$$

where a(1) and a(2) are the areas of chromatograms drawn by the degree of rotation detector and the differential refractive index detector, respectively, for the eluate in the case of the optically pure antipodes.

The optical yield being 0% means that there is no optical resolution ability, and the optical yield being 100% means the racemate was resolved completely to the respective antipodes.

APPLICATION EXAMPLES 2 to 5

The adsorbent prepared in each of Examples 2 to 5 was packed into a stainless steel column and the resolution was conducted under the same conditions as in Application Example 1. The results of resolution of racemic 1,1'-binaphthol are shown in Table 1.

APPLICATION EXAMPLE 6

The adsorbent prepared in Example 6 was packed into a stainless steel column and the resolution was conducted under the same conditions as in Application Example 1. The conditions for chromatography were the same except that the eluting solution was changed to a mixture of toluene/dioxane=95/5. The results of resolution of racemic 1,1'-binaphthol are shown in Table 1.

APPLICATION EXAMPLE 7

The adsorbent prepared in Example 7 was packed into a stainless steel column and the resolution was conducted under the same conditions as in Application Example 1. The conditions for chromatography were the same except that the eluting solution was changed to a mixture of toluene/dioxane=90/10, and the temperature was changed to 10° C. The results of resolution of racemic 1,1'-binaphthol are shown in Table 1.

TABLE 1

| Example No. | Optically active monomer | Characteristic absorption in the infrared absorption spectrum in graft polymer | Graft degree (%) | Optical yield [4] (%) |
|---|---|---|---|---|
| 1 | (S)-N-(1-phenylethyl)methacrylamide | Yes [1] | 31.2 | 90.9 |
| 2 | (S)-N-(1-phenylethyl)methacrylamide | Yes [1] | 9.9 | 58.8 |
| 3 | (S)-N-(1-naphthylethyl)methacrylamide | Yes [1] | 31.1 | 85.3 |
| 4 | (S)-N-(1-cyclohexylethyl)methacrylamide | Yes [1] | 31.7 | 68.2 |
| 5 | N-acryloyl-L-phenylalanine ethyl ester | Yes [1] | 32.0 | 18.6 |
| 6 | (1R,2S,5R)-menthyl methacrylic acid ester | Yes [2] | 27.0 | 5.4 |
| 7 | (1R,2S,5R)-menthyl-N-vinylcarbamic acid ester | Yes [3] | 26.5 | 14.4 |

[1] C = N stretching vibration: In the vicinity of 1650 cm$^{-1}$
[2] C = O stretching vibration: In the vicinity of 1700 cm$^{-1}$
[3] C = O stretching vibration: In the vicinity of 1500 cm$^{-1}$
[4] Resolution of racemic 1,1'-binaphthol

COMPARATIVE EXAMPLE 1

A solution mixture comprising 4.5 g of (S)-N-(1-phenylethyl)methacrylamide, 0.5 g of ethylene glycol dimethacrylate, 0.075 g of 2,2'-azobis(2,4-dimethylvaleronitrile) and 5.0 g of toluene, was added to a solution comprising 0.3 g of polyvinyl alcohol and 29.7 g of water. This mixture was stirred under nitrogen at a rotational speed of about 650 rpm and reacted at 50° C. for 10 hours. The obtained polymer was separated by filtration and purified by washing sequentially with water, methanol, acetone and toluene.

The adsorbent prepared in this manner was packed into a stainless steel column under the same conditions as in Application Example 1, whereby abrupt rising of the pressure due to the densification occured, and it became difficult to let the liquid pass therethrough. Therefore, packing was again tried at a low flow velocity of 1 ml/min, whereby spread of the elution curve due to a low packing density was observed, and the optical resolution was extremely difficult. The resolution of racemic 1,1'-binaphthol was conducted in the same manner as in Application Example 1, whereby the results were as shown in Table 2. From the results, it is evident that with the crosslinked polymer of the optically active monomer, no adequate performance is obtainable also in the optical resolution ability.

TABLE 2

| Adsorbent | Optical yield |
|---|---|
| Comparative Example 1 | 44.3% |

COMPARATIVE EXAMPLE 2

An adsorbent was prepared, and the resolution was conducted in the same manner as in Comparative Example 1 except that the same optically active vinyl monomer as used in Example 5 was used. The results of resolution of racemic 1,1'-binaphthol are shown in Table 3, whereby it is evident that the optical yield is very low.

TABLE 3

| Adsorbent | Optical yield |
|---|---|
| Comparative Example 2 | 5.8% |

We claim:

1. An adsorbent for optical resolution obtained by graft polymerizing an optically active vinyl monomer of the formula:

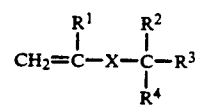

(I)

wherein X is —CONH—, —COO— or —NHCOO—, $R^1$ is a hydrogen atom or a methyl group and each of $R^2$ to $R^4$, which are different from one another, is a hydrogen atom, a hydrocarbon group or an alkoxycarbonyl group, or $R^2$ and $R^3$ together form a ring, to a crosslinked polymer carrier, having a weight ratio of a crosslinkable monomer to the total amount of polymerizable monomers of at least 15%, having a surface area of from 1 to 2,000 m$^2$/g, having an average particle size of from 1 to 1,000 μm, and having groups to which said monomer is graft polymerizable.

2. The adsorbent for optical resolution according to claim 1, wherein the optically active vinyl monomer is a monomer of the formula I wherein $R^4$ is a hydrogen atom, $R^2$ is a lower alkyl group or a lower alkoxycarbonyl group, and $R^3$ is an aryl group, an aralkyl group or a cyclohexyl group, or $R^2$ and $R^3$ together form a cycloalkane.

3. The adsorbent for optical resolution according to claim 1, wherein the optically active vinyl monomer is a monomer of the formula:

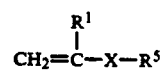

(II)

wherein X is —CONH—, —COO— or —NHCOO—, $R^1$ is a hydrogen atom or a methyl group, and $R^5$ is one member selected from the group consisting of (R) and (S)-1-phenylethyl, (R) and (S)-1-naphthylethyl, (R) and (S)-1-cyclohexylethyl, (R) and (S)-1-ethoxycarbonyl-2-phenylethyl and eight possible optical isomers of 5-methyl-2-(1-methylethyl)-cyclohexyl.

4. The adsorbent for optical resolution according to claim 1, which contains from 5 to 60% by weight, based on the total weight of the adsorbent, of units derived from the optically active vinyl monomer.

5. The adsorbent for optical resolution according to claim 1, wherein the crosslinked polymer carrier is selected from the group consisting of a polymer having diol groups, a polymer having radical polymerizable double bonds, a polymer having mercapto groups and a polymer having halogen groups.

* * * * *